United States Patent [19]

Murty

[11] 4,149,994

[45] Apr. 17, 1979

[54] GRANULAR ACTIVATED CARBON MANUFACTURE FROM BROWN COAL TREATED WITH DILUTE INORGANIC ACID

[75] Inventor: Hari N. Murty, Grand Island, N.Y.

[73] Assignee: The Carborundum Company, Niagara Falls, N.Y.

[21] Appl. No.: 856,881

[22] Filed: Dec. 2, 1977

[51] Int. Cl.$^2$ .................. B01J 21/18; C01B 31/08; C01B 31/10; C01B 31/14

[52] U.S. Cl. .................. 252/444; 252/422; 252/423; 252/445; 423/449

[58] Field of Search .............. 252/421, 422, 423, 444, 252/445; 423/445, 449, 461

[56] References Cited

U.S. PATENT DOCUMENTS

| | | | |
|---|---|---|---|
| 3,483,134 | 12/1969 | Olson | 252/421 |
| 3,623,999 | 11/1971 | Jungten | 252/421 |
| 3,876,505 | 4/1975 | Stoneburner | 252/445 |
| 3,993,456 | 11/1976 | Cole et al. | 44/1 R |
| 3,998,604 | 12/1976 | Hinkley | 44/1 R |
| 4,014,817 | 3/1977 | Johnson et al. | 252/421 |
| 4,032,476 | 6/1977 | Murty | 252/422 |
| 4,039,473 | 8/1977 | Shafer | 252/425 |

FOREIGN PATENT DOCUMENTS 906754  8/1972  Canada .................. 252/444

Primary Examiner—Winston A. Douglas
Assistant Examiner—P. E. Konopka
Attorney, Agent, or Firm—David E. Dougherty; Robert C. Weber

[57] ABSTRACT

Granular activated carbon is manufactured from briquettes of about 1"×2", formed from brown coal, from which iron material has been extracted and which has a moisture content of about 15% by weight, by crushing and screening the pretreated coal briquettes to produce 8/30 mesh granules, treating the granules with a dilute aqueous solution of inorganic acid ($H_2SO_4$, $H_3PO_4$ or HCl) at a concentration of about 1 to about 10% by weight to reduce the volatile content and thereby increase the fixed carbon content comprising: mixing the granules with the acid, washing off the acid, and drying the granules at least partially to a moisture content below about 25% by weight. In one case the washed granules are dried partially to a moisture content of about 10 to about 25% by weight without the addition of a carbonaceous binder such as coal tar pitch. In the other case the granules are dried thoroughly and mixed with about 5 to about 15% by weight of coal tar pitch. The so treated granules are ground to form fine powder of more than about 65% by weight −325 mesh, more preferably 75 to 85% by weight −325 mesh, which is compressed into shapes such as pellets of 0.5" diameter and 0.5" long under a pressure of 40,000 to 80,000 psi, and then granulated to obtain 6/20 mesh granules. These reformed granules are devolatilized, without charring, by directly heating to and at a temperature higher than the charring temperature in an oxygen-free atmosphere, and then activated by heating to and at a temperature higher than the devolatilizing temperature in an atmosphere containing a gaseous activating agent. The overall yield of granular activated carbon is not less than about 22% by weight, dry basis, and the activated granules have a surface area of not less than about 900 m$^2$/gram, an Iodine number of not less than about 900, an ash content of not more than about 7% by weight, an abrasion number of not less than about 70, an apparent density of not less than about 0.46 gram/cc, and a Molasses number of not less than about 200; which properties make them suitable for use in water and waste water treatment and in other applications.

24 Claims, 1 Drawing Figure

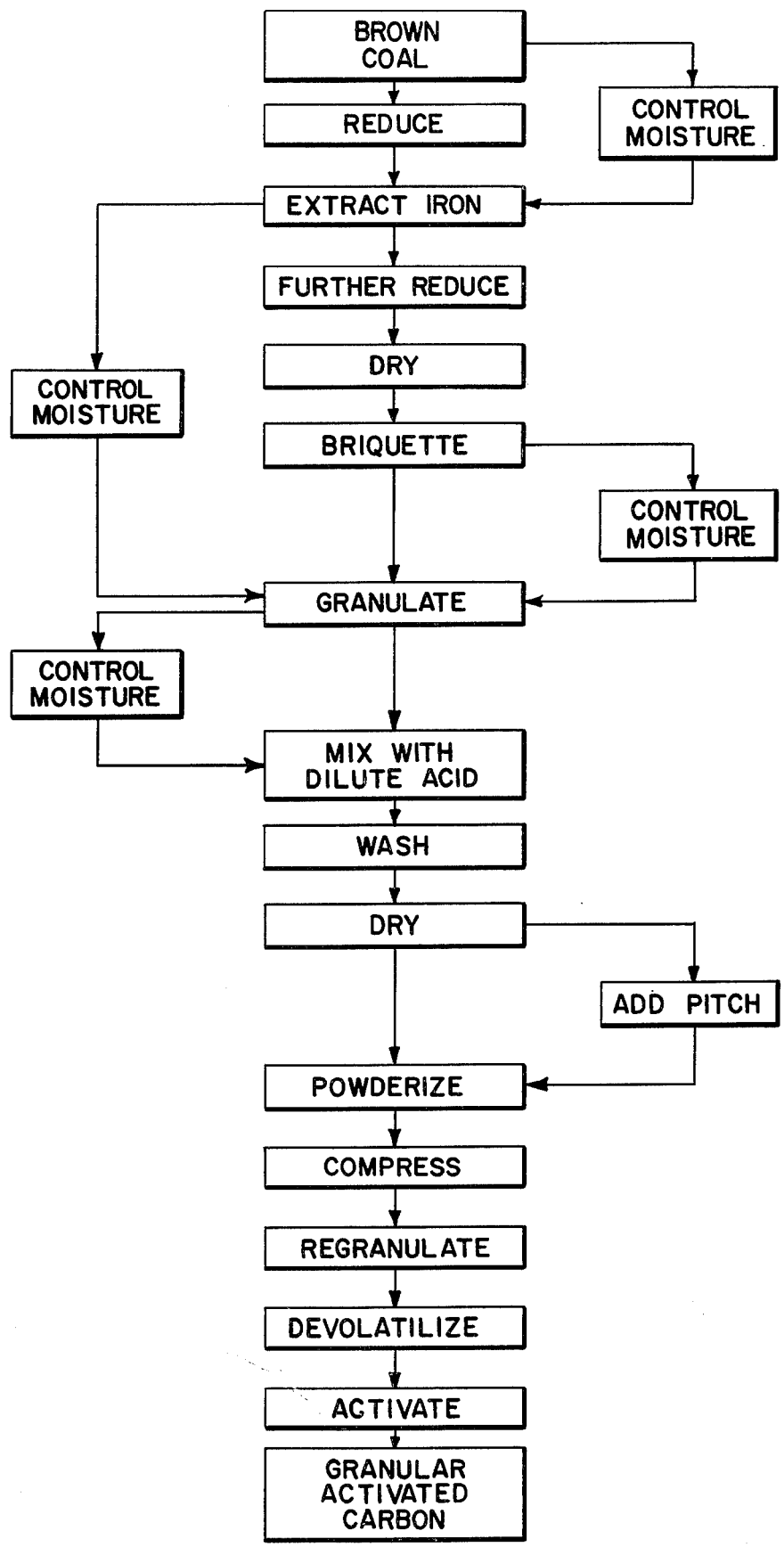

GRANULAR ACTIVATED CARBON MANUFACTURE FROM BROWN COAL TREATED WITH DILUTE INORGANIC ACID

This application is related to my copending applications Serial No. 884,084, filed July 25, 1977, and Serial No. 818,699, filed March 6, 1978, as well as to my prior U.S. Patent 4,032,476, issued June 28, 1977.

BACKGROUND OF THE INVENTION

1. Field of the Invention

This invention relates to granular activated carbon manufacture, and more particularly to a new and improved process for making granular activated carbon from brown coal treated with dilute inorganic acid, and to a new and improved granular activated carbon made by such process and having properties which make it suitable for use in water and waste water treatment and in other applications.

2. Glossary of Terms

In order to facilitate a clear understanding of this invention, various terms of art employed herein are defined as follows.

Abrasion number—is a pressure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon—is a carbon which is "activated" by heating to high temperature preferably with steam or carbon dioxide as the gaseous activating agent in producing an internal porous particle structure.

Activating—means heating coal at high temperatures on the order of about 600° C. to about 1000° C. in the presence of a gaseous activating agent, as is well known in the art.

Adsorption isotherm—is a measurement of the adsorptive capacity of an absorbent (viz. granular activated carbon) as a function of the concentration, or pressure, of the adsorbate (viz. $N_2$) at a given temperature. It is defined as the constant temperature relationship between the amount adsorbed per unit weight of adsorbent and the equilibrium concentration, or partial pressure.

Apparent density—is the weight per unit volume of homogeneous granular activated carbon. To assure uniform packing of the granules during measurement, a vibrating trough is used to fill the measuring device.

Ash—is a principal mineral constituent of coal, carbon and pitch. It is normally defined as a weight percent basis after a given amount of sample is reduced to ash.

Average (mean) particle diameter—is a weighted average diameter of a granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained.

Brown coal—is a low rank lignitic type coal which is ranked below sub-bituminous coal, together with and usually slightly below lignite. Typically, in the moist, as received, or as mined condition, it has a moisture content of more than 40% by weight and generally a moist BTU/lb. of less than 8300, and usually is unconsolidated. See ASTM standard D-388-66, wherein BTU wise, "brown coal", as used herein, would be included in the designation "Lignite A" or "Lignite B", but also see former ASTM standard D-388-58, wherein "brown coal", as used herein, is distinguished from and ranked below "lignite", as used herein, by reason of brown coal's usual unconsolidated characteristic.

Charring—means heating coal at low temperatures on the order of about 175° C. to about 275° C. in the presence of oxygen.

Coking value—is usually expressed as percent residual carbon obtained when a dry sample of coal, tar or pitch is vaporized or pyrolyzed for a specific time at a specific temperature that limits the available oxygen supply (ASTM Method D-2416). The coking value, expressed as percent residual carbon, indicates the coke forming properties of the material.

Devolatilizing—means heating coal at intermediate temperatures on the order of about 400° C. to about 600° C. in an oxygen-free atmosphere.

Granular activated carbon—is "activated carbon" which has a particle size, i.e., "mesh", which is not less than about 40 and preferably not less than about 60.

Iodine number—is the milligrams of iodine adsorbed by 1 gram of granular activated carbon at an equilibrium filtrate concentration of 0.02 N iodine. It is measured by contacting a single sample of carbon with an iodine solution and extrapolating to 0.02 N by an assumed isotherm slope. This number can be correlated with the ability of granular activated carbon to adsorb low molecular weight substances.

Lignite—is a low rank lignitic type coal which is ranked below sub-bituminous coal, together with and usually slightly above brown coal. Typically, in the moist, as received, or as mined condition, it has a moisture content of more than 20% by weight and generally a moist BTU/lb. of less than 8,300, and usually is consolidated. See ASTM standard D-388-66, wherein BTU wise "lignite", as used herein, would be included in the designation "Lignite A or "Lignite B", but also see former ASTM standard D-388-58, wherein "lignite", as used herein, is distinguished from and ranked above "brown coal", as used herein, by reason of lignite's usual consolidated characteristics.

Mesh—(or mesh size) is the particle size of granules as determined by the U.S. Sieve Series or the Tyler Series. Usually, this term refers to the sizes of the two screens, in either of the above Series, between which the bulk of a sample falls. For example, "8/30 mesh" (or "8 by 30 mesh" or "8×30 mesh") means that 90% by weight of the sample will pass through a No. 8 screen but will be retained on a No. 30 screen. Alternatively, this term refers to a maximum particle size, such as in defining the fineness of powder material. For example, "65% by weight −325 mesh powder" means that 65% by weight of a given sample passes through a No. 325 mesh screen.

Molasses number—is calculated from the ratio of the optical densities of the filtrate of a molasses solution treated with a standard activated carbon and the activated carbon in question.

Pitch—is a black or dark viscous substance obtained as a residue in the distillation of organic materials and especially tars.

Powder—means powdered activated carbon which has a particle size, i.e., "mesh", which is smaller than about 40 and preferably smaller than about 60. The larger the mesh number, the smaller the size.

Surface area—is the amount of surface area per unit weight of granular activated carbon; it is determined from the nitrogen adsorption isotherm by the Brunauer, Emmett and Teller (BET) method, and is is expressed in $m^2$/gram.

PRIOR ART

Granular activated carbon is particularly useful in water and waste water treatment not only because it is highly effective in purifying the intake, as well as the effluent from municipal and industrial systems, but also because it can be regenerated for repeated use. However, in order to accomplish these objectives it must possess certain properties, namely, a minimum surface area of about 900 $m^2$/gram for adequate adsorption capacity, a minimum Iodine number of about 900 for adequate adsorption of low molecular weight substances, a minimum Molases number of about 200 for adequate decolorizing, a maximum ash content (by weight) of not more than about 12 percent, and preferably not more than about 8%, for purity, a minimum abrasion number of about 70 and preferably not less than about 80, for adequate hardness in maintaining granular integrity in use and in regeneration, and a minimum apparent density of not less than about 0.46 gram/cc, preferably about 0.48 gram/cc, for obtaining the dense, closely packed beds and columns needed in water and waste water treatment.

These properties can be obtained by making granular activated carbon from bituminous coal and from sub-bituminous coal, such as disclosed in each of my aforesaid copending applications, and my aforesaid patent, but until the present invention it is not known that anyone else has accomplished this by dilute inorganic acid treatment of brown coal, which is considerably cheaper, as the starting material, than bituminous coal, and usually even cheaper than sub-bituminous coal.

Moreover, when so using bituminous coal, it has been found necessary not only to mix in pitch but also to char the granulated mixture prior to the devolatilizing and activating steps. Otherwise, because of the high coking tendency of the preferred bituminous coals, the granules fuse together during devolatilization and are thereby rendered unsuitable both for proper activation and for obtaining the aforesaid desired properties. Likewise, in working with various bituminous coals, it has been found that this charring step is necessary, whether or not the granules have been treated with a dilute aqueous solution of inorganic acid prior to the pitch addition and charring. While it has been found that such acid treating does have a substantial beneficial effect: (1) on at least the aforesaid properties of granular activated carbon produced from low rank bituminous coal, as disclosed in my aforesaid copending Ser. No. 818,699, and (2) on both the overall yield and properties of granular activated carbon produced from sub-bituminous coal, such treatment has little, if any, beneficial effect upon either the overall yield of the resulting granular activated carbon or the properties desired, when working with a highly coking, preferred bituminous coal.

Furthermore, it has been found herein that granular activated carbon of the aforementioned properties can not be produced from brown coal when such coal is not subjected to such dilute acid treatment or charring, despite the fact that such coal usually is not coking at all. Although it has been found herein that brown coal can be charred, without such acid treatment, to produce granular activated carbon the yield is very low and the properties, at best are below the minimum acceptable for granular activated carbon suitable for use in waste water treatment and other applications. As a matter of fact, it has been found herein that the charring step, originally thought necessary for so processing brown coal, can be eliminated, and that if appropriate dilute inorganic acid treatment is employed, this results in significant increases not only in yield, but also in the desired properties. In addition, it has been found herein that, while a combination of dilute inorganic acid treatment and carbonaceous binder such as pitch addition make for optimum yield and properties, the carbonaceous binder can be eliminated entirely and still produce a significantly increased yield, as well as acceptable properties.

Moreover, and surprisingly enough, it has been found that such acid treatment does not produce an acceptable granular activated carbon product from lignite, at least the particular variety treated.

There have been some attempts in the past, as set forth in U.S. Pat. No. 2,049,931, to produce activated carbon from brown coal or lignite by the addition thereto of concentrated acids, but following the teachings of this patent does not allow one to make a hard granular activated carbon, rather only powdered activated carbon. A more recent attempt to make a commercially successful activated carbon from low grade coal, such as bituminous, sub-bituminous and lignitic coals by dilute acid treatment is disclosed in U.S. Pat. No. 4,014,817. However, the purpose of this treatment is to increase the sorbant properties of the product by the removal of magnesium and calcium salts, and the patented process still requires heat oxidation of the coal following acid treatment. This heat oxidation adversely affects yield, and tests have shown that the granular product of the patent, while dense and sorptive, does not possess the hardness required for maintaining granular integrity in use and in regeneration. Thus, the patented product is not suitable for use in water and waste water treatment.

Other more recent attempts to produce activated carbon from Australian brown coal are indicated in U.S. Pat. Nos. 3,998,604 and 4,039,473.

In the former, the process actually disclosed merely provides an acid environment which consists in the separation of sand and clays present in the coal for demineralization purposes (i.e., ash removal) only. Although this patent briefly mentions further treatment for preparing activated carbon, it does not specify either how this is to be done or the quality and type of product ultimately to be produced.

In the latter, the process disclosed is directed to the production of activated carbon by first converting the coal into a potassium coal, carbonizing the same and then acid leaching to remove potassium, followed by activation. While the activated granular product is said to have high surface area, the hardness, density and integrity thereof are not even mentioned.

Hence, neither of these two patents suggests an operational process for successfully producing a hard and dense granular activated carbon suitable for use in water and waste water treatment.

SUMMARY OF THE INVENTION

Accordingly, a general primary objective of the present invention is (1) to provide a new and improved process for making hard granular activated carbon from lower cost brown coal instead of higher cost bituminous coal, and wherein the charring step necessary for processing bituminous coal is eliminated, while the overall yield of granular activated carbon is increased significantly by appropriate treatment of brown coal by treating with a dilute aqueous solution of inorganic acid, with or without the addition of carbonaceous binder; (2) as well as to provide a new and improved hard granular activated carbon made by such process and having the aforementioned desired properties of adsorption (as measured by surface area and iodine number), decolorization (as measured by Molasses number), purity (as measured by ash content), hardness (as measured by abrasion number) and density (as measured by apparent density), which make it suitable for use in water and waste water treatment and in other applications. To this end, the invention includes (1) a process for making hard granular activated carbon suitable for use in water and waste water treatment and in other applications comprising: forming granules from brown coal; treating the granules with a dilute aqueous solution of inorganic acid to reduce the volatile content and thereby increase the fixed carbon content comprising: mixing the granules with the acid, washing off the acid, and drying the granules at least partially to a moisture content below about 25% by weight; reducing the treated granules to form fine powder; compressing the powder to form shapes; reducing the shapes to reform granules; devolatilizing the reformed granules, without charring, by directly heating to and at a temperature higher than the charring temperature in an oxygen-free atmosphere; and activating the devolatilized granules by heating to and at a temperature higher than the devolatilizing temperature in an atmosphere containing a gaseous activating agent; and (2) hard granular activated carbon made by such process. The shapes may be of various configurations larger than the granules such as pellets, briquettes, thin sheets of corrugated cross-section, etc.

A specific primary objective is to provide (1) such process wherein the coal has an ash content of not more than about 5% by weight, dry basis, and preferably below about 5% by weight, dry basis; prior to forming the granules, the coal is pre-treated by extracting iron material, preferably from coarse particles formed by reducing the coal, followed by further reducing the extracted coarse particles to form fine particles which are dried partially to a moisture content of about 10 to about 25% by weight, followed by compressing the partially dried fine particles under a pressure of not less than about 5,000 psi, preferably about 5,000 to about 10,000 psi, to form briquettes, from which the granules are formed; at least one of the coal and granules has a moisture content of not more than about 25% by weight, preferably about 10 to about 25% by weight prior to treating the granules; the acid is selected from the group consisting of $H_2SO_4$, $H_3PO_4$, HCl and mixtures thereof, the preferred acid is $H_3PO_4$, and the acid concentration is between about 1 and about 10% by weight; the treated granules are reduced to fine powder of more than about 65% by weight −325 mesh, preferably about 75 to about 85% by weight −325 mesh; the powder is compressed or compacted to form shapes under a pressure of not less than about 40,000 psi; the reformed granules are devolatilized by heating to a temperature of about 400° C. to about 600° C. at a rate of about 50° C. to about 300° C. per hour for a time of about ½ hour to about 3 hours; and the devolatilized granules are activated by heating to a temperature of about 600° C. to about 1000° C. for a time of about 1 hour to about 6 hours; in order to produce an overall yield of granular activated carbon of not less than about 20%, preferably not less than about 26% by weight; and (2) such granular activated carbon made by such process and having a surface area of not less than about 900 m$^2$/gram, preferably not less than about 1000 m$^2$/gram; an Iodine number of not less than about 900, preferably not less than about 950, an ash content, by weight, of not more than about 12%, preferably not more than about 8%, and more preferably not more than about 7%; an abrasion number of not less than about 70, preferably not less than about 80; an apparant density of not less than about 0.46 gram/cc, preferably not less than about 0.48 gram/cc; and a Molasses number of not less than about 200.

Another specific primary objective is to provide (1) such process wherein the granules after being washed to remove the acid are dried partially to a moisture content of about 10 to about 25% by weight, preferably about 15% by weight, without the addition of a carbonaceous binder such as pitch; and the overall yield is not less than about 20% by weight, dry coal basis; (2) such granular activated carbon made by such process and having a surface area of not less than about 900 m$^2$/gram, and Iodine number of not less than about 900, an ash content of not more than about 7% by weight, an abrasion number of not less than about 70, and an apparent density of not less than about 0.46 gram/cc.

Still another specific primary objective is to provide (1) such pitchless process wherein the acid is $H_3PO_4$ and the overall yield is not less than about 25% by weight, dry coal basis; and (2) such granular activated carbon made by such process and having an apparent density of not less than about 0.46 gram/cc.

Yet another specific primary objective is to provide (1) such process wherein the granules after being washed to remove the acid are dried thoroughly (i.e., to a moisture content of not more than about 5% by weight, preferably not more than about 3% by weight), and thereafter mixed with about 5 to about 15% by weight of carbonaceous binder such as pitch and the overall yield is not less than about 24% by weight, dry coal binder mixture basis; and (2) such granular activated carbon made by such process and having a surface area of not less than about 900 m$^2$/gram, an Iodine number of not less than about 900, preferably not less than about 950, an ash content of not more than about 6% by weight, an abrasion number of not less than about 70, preferably not less than about 80, and an apparent density of not less than about 0.48 gram/cc.

A further specific primary objective is to provide (1) such pitch process wherein the acid is $H_3PO_4$ and the overall yield is not less than about 26% by weight, dry coal binder mixture basis; and (2) such granular activated carbon made by such process and having a surface area of not less than about 1050 m$^2$/gram, an Iodine number of not less than about 1000, an ash content of not more than about 6% by weight, an abrasion number of not less than about 70, preferably not less than about 80, an apparent density of not less than about 0.48 gram/cc, and a Molasses number of not less than about 200.

Additional objectives and advantages of the invention will become apparent upon consideration of the following detailed description and accompanying drawing wherein:

BRIEF DESCRIPTION OF THE DRAWING

The single FIGURE is a block diagram or flow sheet illustrating schematically the various steps of the process, as well as the resulting product, both embodying the invention.

DESCRIPTION OF THE PREFERRED EMBODIMENTS

In this detailed description, reference will be made to eleven Examples, of which Examples 1 and 6-8 relate to and provide background for the present invention, while Examples 2-5, 9-11 are illustrative of the invention per se. Moreover, the order or sequence of the Examples has been selected in order to show a progression in experimentation from Example 1, which represents an attempt to apply a known charring technique for making granular activated carbon from bituminous coal to brown coal; through the inventive acid treatment techniques of Examples 2-5; to Examples 6 and 7 which compare the results obtained by attempting to superimpose an inventive acid treatment technique (Example 7) on a known charring technique (Example 6) for making granular activated carbon from bituminous coal; to Example 8, which shows that an inventive dilute acid treatment technique does not work as well for lignite, and finally to inventive Examples 9-11, which respectively show the importance of fineness of grinding in powderizing (Example 9), the workability of HCl (Example 10) along with $H_2SO_4$ (Example 4) and $H_3PO_4$ (Example 5), and the benefial effect of dilute acid treatment on brown coal in reducing volatile content and thereby increasing fixed carbon content (Example 11).

EXAMPLE 1

Charring of Brown Coal in Making Granular Activated Carbon

In making granular activated carbon from bituminous coal it has been found necessary to char the coal granules prior to activation, as will be seen below in Examples 6 and 7. Thus, this technique was adopted in order to see what sort of product could be so obtained from brown coal. The starting material for these and each of the ensuing Examples 2-5, 9 and 10 was a batch of Australian brown coal having the following analyses, by weight in the moist, as received, or as mined condition and in the dry condition, respectively:

| Proximate Analysis | | | Ultimate Analysis | |
|---|---|---|---|---|
| | Moist | Dry | | Dry |
| % Moisture | 66.0 | — | % Carbon | 67.4 |
| % Volatile Material | 17.5 | 51.4 | % Hydrogen | 4.7 |
| | | | % Nitrogen | 0.5 |
| % Ash | 0.7 | 2.1 | | |
| | | | % Sulfur | 0.3 |
| % Fixed Carbon | 15.8 | 46.5 | | |
| BTU/lb. | — | 3,000 | % Oxygen (Difference) | 27.1 |

These analyses, except perhaps for ash content, are, in general, typical of brown coal.

Prior to acid treatment, and as shown in the drawing, the brown coal, in the moist, as received, or as mined condition, was subject to a coarse reduction by crushing and screening to roughly 4 mesh size, after which it was passed under an electromagnet to extract iron material. The so extracted coarse particles were further reduced in a hammer mill to produce fine particles of about 20 mesh, and then steam dried to a controlled moisture content of about 15% by weight, although a range of about 10 to about 25% is quite feasible. Next, the partially dried fine particles were compacted at a pressure of about 5,000 to about 10,000 psi to form briquettes of about 1"×2", these briquettes being more economical for transportation from the mining site to the acid treatment site. Thus, such briquettes formed the starting material in the present work.

At the same time, it should be understood that while the above constitutes the preferred procedure, the essential step is the iron material extraction, whether or not briquettes are formed, in order to remove as much as possible the forms of iron, iron oxides and other iron compounds which are not readily soluble in the treating acid, and would otherwise remain as ash in the granular activated carbon, thereby detracting from its purity.

As far as moisture control is concerned, it is important, and in the as mined condition, a moisture content of 66% by weight makes the coal somewhat more difficult to work with. Thus, it is preferred that the extracted fine particles be steam dried partially as noted above, to a moisture content of 10 to 25%, preferably 15% by weight, in order to form compact briquettes. At the same time, while convenient and preferred, briquetting is not an absolute necessity. Hence, as shown at the upper left and right in the drawing, the moisture could be so controlled if desired, either before or after the extraction, such as if the coal were to be granulated without briquetting. However, as will be seen below, such moisture control at either of the above stages is not an absolute necessity.

Returning to the preferred procedure, the pre-treated brown coal briquettes were crushed to a very fine size such that more than 65% by weight of the material passed through 325 mesh screen, preferably about 75 to 85% by weight -325 mesh. The powder was pressed at 40,000 to 80,000 psi pressure into cylindrical pellets approximately ⅛" high and ⅛" diameter. The apparent density of these pellets was in the range of 1.1 to 1.2 grams/cc. The pellets then were granulated to obtain granules of 6 by 20 mesh with an apparent density in the range of 0.64 to 0.68 gram/cc. In the course of experimentation, and as also will be seen from Examples 2 and 3, it was found that to obtain hard compact reformed granules (suitable for further processing in obtaining hard granular activated carbon) without the use of a carbonaceous binder such as coal tar pitch, the moisture content of the brown coal briquettes and/or granules formed therefrom and/or powder resulting therefrom is important. Too low a moisture content, i.e., below about 10% by weight, or too high a moisture content, i.e., above about 25% by weight, led to poor compaction, and hence granules that were not hard and dense.

Thus, as shown at the right of the drawing, should the briquettes pick up too much moisture, such as the result of a rainstorm, for example, they can be dried to the proper moisture content before granulating, e.g., to minimize gumming of the mill. If, on the other hand, such briquettes become too dry, they can be moisturized to minimize dusting on granulating. Alternatively, the granules can be dried or wet to the proper moisture content before powderizing, for ease of powderizing. Still another approach would be to control the moisture of the powder to within the above noted range, because hard compact pellets can not be formed, either with too much or too little moisture, because they will disintegrate upon regranulating to form mostly powder, with the few granules resulting being neither hard enough nor compact enough for further processing into granular activated carbon. However, in this Example, the 15% by weight moisture content of the pre-treated brown coal briquettes was well within the prescribed limits, and hence no drying or moisturizing was necessary in the first instance.

600 grams of the reformed granules obtained according to the procedure described above were loaded into a cylindrical container prepared from 50 mesh screen. The container was mounted onto a cylindrical shaft and the assembly was loaded into a cylindrical furnace so that the container and the granules therein were rotated slowly and uniformly (1 to 2 rpm) inside the furnace.

The granules then were subjected to a charring treatment wherein the granules were heated in an atmosphere of air and nitrogen (deficient oxygen) to 200° C. at the rate of 100° C./hour, and maintained at this temperature for 1 hour. During this process, the granules were slowly and uniformly rotated (1 to 8 rpm) so that they were exposed to the oxidizing action of $O_2$ present. During the course of experimentation, it was found that higher temperatures and/or higher oxygen content in the atmosphere led to poor process control and eventually a poor product. The loss of weight in the charring step was in the range of 5 to 15% by weight based on the dry coal.

The granular material then was subjected to a devolatilization process. The granules were loaded into the furnace described above and heated to 450° C. at the rate of 300° C./hour in an atmosphere free from oxygen (in the present case an atmosphere composed of $N_2$ and the volatiles given off by the granules), and maintained at the devolatilizing temperature for 1 hour and then cooled. During the course of experimentation it was learned that the charring and devolatilization steps could be carried out sequentially without cooling down, provided the atmosphere was altered such that it was nearly free of oxygen during heat up beyond 200° C. It also was learned that the presence of oxygen at these higher temperatures led to higher losses, poorer yield of product and in general an inferior granular product.

The yield of granules after devolatilization was about 50 to 60% by weight based on charred granules, and their apparent density was about 0.6 gram/cc.

Next, the devolatilized granules were loaded into a cylindrical furnace and were subjected to activation by heating the granules to 800° to 900° C. in an atmosphere composed of a carrier gas of $N_2$ and steam and by maintaining the granules at the activating temperature for 4 to 5 hours. The amount of steam fed in was pre-determined such that it amounted to 1 to 3 grams of steam/gram of charge/hour.

The yield of granular activated carbon from this step was in the range of 30 to 40% by weight based on devolatilized material. The granular product has a surface area of 600 to 900 $m^2$/gram, an ash content in the range of 6 to 8% by weight, an abrasion number of about 55 to 60 and an apparent density in the range of 0.40 to 0.44 gram/cc.

The overall yield based on dry coal was 15 to 20% by weight and the granules had adsorption properties, ash, density and hardness which were below those required for granular activated carbon for use in water and waste water treatment and in other applications. During the course of experimentation, it was learned that if the brown coal was processed as above, but without the charring step, the resultant product was soft and had less activity, thus indicating the importance of charring the brown coal (when processed by itself), even though such a coal is not coking at all.

The following Examples 2–5 represent preferred embodiments of the present invention, which is represented schematically in the drawing. Thus, from a method standpoint, a preferred embodiment of the inventive process generally includes the steps of granulating the pre-treated brown coal briquettes which have, in the as received condition, the proper moisture content range of about 10 to about 25% by weight, preferably 15%, or are dried, or moisturized as shown at the middle right of the drawing, to so control such moisture content prior to granulating; followed by the steps of treating the granules with a dilute aqueous solution of inorganic acid to reduce the volatile content and thereby increase the fixed carbon content comprising: mixing the granules with the acid, washing off the acid and drying the granules at least partially to a moisture content below about 25% by weight; powderizing; compressing; regranulating; devolatilizing, without charring, and activating; all in order to produce the desired inventive product of granular activated carbon which is acceptable for use in water and waste water treatment and in other applications.

The inventive process also contemplates the following variations. The brown coal, following iron material extraction can be directly granulated, with or without moisture control, before and/or after the iron extraction step, as shown at the upper right and left of the drawing. Alternatively a moisture control operation can occur following granulating, as shown at the middle left of the drawing, if so desired. This would be feasible, where the granules were too wet, in order to avoid the need for an excessive amount of dilute aqueous solution for proper acid treating, but obviously would not be needed if the granules were too dry, because the dilute aqueous solution would remedy this problem automatically. In any event, while the steam drying and briquetting pre-treatment procedure is preferred, the inventive process does contemplate any one or more of the above noted variations as necessary or desired.

Examples 2 and 3 represent two preferred embodiments of such treatment wherein the granules are treated with dilute aqueous solutions of $H_2SO_4$ and $H_3PO_4$ respectively, washed and partially dired to the above noted proper moisture content range, and preferably to about 15% by weight, followed directly by powderizing, etc., without the addition of pitch, as shown in the drawing. Examples 4 and 5 represent two different and more preferred embodiments of such treatment wherein the granules are treated with dilute aqueous solutions of $H_2SO_4$ and $H_3PO_4$ respectively, followed by washing off the acid, by drying thoroughly (i.e., to a moisture content of not more than about 5% by weight, preferably not more than about 3% by weight) and by mixing with a carbonaceous binder such as pitch, prior to powderizing, etc., as shown at the middle right side of the drawing.

EXAMPLE 2

Dilute $H_2SO_4$ Treated Brown Coal Granules (Without Pitch) in Making Granular Activated Carbon A batch of Australian brown coal briquettes described in Example 1 was crushed and screened to obtain 8×30 mesh granules. 300 grams of the granules were loaded into a 4 liter kettle, and a dilute aqueous acid solution consisting of 150 cc of 98% concentrated $H_2SO_4$ and 2850 cc of water was added to the granules (about 6.5% acid, by weight, or 5% by volume). The granules and the acid solution were heated to 80° C. and maintained at this temperature for 5 hours, while the granules were continuously stirred. During the course of experimentation, it was learned that size of granules, temperature of treatment (which is usually below 100° C. because of the use of the dilute aqueous acid solution), time of treatment, concentration of acid, and the ratio of dilute aqueous solution to coal all have important effects on further processibility of the coal to form granular activated carbon. Therefore, the specific numbers cited in this and the ensuing inventive Examples are merely illustrative and not restrictive. For example, both coarser and finer granules can be employed during treatment with corresponding results, with the time of treatment being longer for coarser particles and shorter for finer particles.

As a result of experimentation, it has been found that a preferred acid concentration range in the dilute aqueous solution is from about 1 to about 10% by weight.

The contents of the slurry were allowed to cool, the solution decanted, and the granules were thoroughly rinsed such that wash water off the granules analyzed to a pH of 6 to 7. To complete the treatment, the leached granules were dried partially to an approximate moisture content of 15% which is that preferred, while about 10 to about 25% by weight is feasible, for good compaction in forming the pellets and hard, dense granules therefrom, without the use of a carbonaceous binder.

The treated granules containing roughly 15% by weight of moisture were milled into a very fine powder such that more than 65% by weight of the material passed through 325 mesh screen, preferably 75 to 85% −325 mesh, as explained in Example 9 below. The powder was pressed into cylindrical pellets of ½" diameter and ½" high using a pressure of 40,000 to 80,000 psi, the apparent density of the pellets being in the range 1.1 to 1.2 grams/cc. These pellets were regranulated to obtain 6×20 mesh granules having an apparent density of 0.62 to 0.66 gram/cc. The reformed granules were loaded into a cylindrical furnace and devolatilized as described in Example 1, but without the charring step, which devolatilization consisted of directly heating the granules to 450° C. at 300° C./hour in an atmosphere free of oxygen and holding at temperature for 1 hour. This devolatilization step can be varied such as by using a heating rate of about 50° C. to about 300° C. per hour to a final temperature of about 400° C. to about 600° C., with the time at temperature ranging from about ⅔ hour to about 3 hours, in an inert atmosphere.

During the course of experimentation it was learned that the charring step described in Example 1 is not necessary to make hard and adsorptive granular activated carbon. Two batches of identical material, treated in dilute aqueous acid solution as described above, were processed, one with a charring step and the other without. While the yields in specific process steps varied, the overall yield and activity of the granular activated carbon product were the same, indicating that the charring step can be eliminated for this material. This presumably was a result of the coal being subjected to the dilute aqueous acid solution treatment.

The devolatilized granules which had an apparent density of 0.58 gram/cc, were loaded into a cylindrical furnace and subjected to activation by heating the granules to 800 to 900° C. in an atmosphere composed of $N_2$ and steam, and by maintaining the granules at this temperature for 4 to 5 hours. The amount of steam fed into the furnace was precalibrated such that it amounted to 1 to 3 grams of steam/gram of charge/hour. This activation step can be varied, such as by using a heating rate of about 100° C. to about 1000° C. per hour to a temperature of about 600° C. to about 1000° C., with the time ranging from about 1 hour to about 6 hours in an atmosphere containing one or more gaseous activating agents such as $CO_2$, air and steam.

The resulting overall yield of granular activated carbon, based on the dry coal, was in the range of 20 to 25% by weight, versus 15 to 20% for Example 1. The granules had a surface area of about 1000 $m^2$/gram, as compared to 600 to 900 for Example 1, an iodine number of 950 to 1000, an ash content of 4 to 6% by weight, as compared to 6 to 8% for Example 1, an abrasion number of 70 as compared to 55 to 60 for Example 1, and an apparent density of 0.46 to 0.48 gram/cc, as compared to 0.40 to 0.44 for Example 1.

Thus, these granules were hard, very adosrptive, low in ash and in most respects comparable to the grades of carbon preferred for use in water and waste water treatment and in other applications. Further, it is to be noted that not only can an acceptable granular activated carbon product be made from brown coal without the use of any carbonaceous binder such as coal tar pitch, and without charring, but also that treatment with a dilute aqueous acid solution significantly increases yield and adsorption, while also reducing ash content, all as compared to Example 1. It also is noteworthy that a hard granular activated carbon was prepared from brown coal (with abrasion number of 70) for the first time without the use of a carbonaceous binder.

EXAMPLE 3

Dilute $H_3PO_4$ Treated Brown Coal Granules (Without Pitch) in Making Granular Activated Carbon A batch of Australian brown coal briquettes described in Example 1 was crushed and screened to obtain 8×30 mesh granules, 300 grams of which were loaded into a 4 liter kettle. A dilute aqueous acid solution consisting of 150 cc of 75% concentrated $H_3PO_4$ and 2850 cc of water was added to the granules (about 6.5% by weight). The granules and the acid solution were heated to 80° C. and maintained at this temperature for 5 hours, while the granules were continuously stirred. The contents were allowed to cool, the solution decanted, and the granules were thoroughly rinsed such that wash water off the granules analyzed to a pH of 6 to 7. To complete the treatment, the washed granules were dried partially to an approximate moisture content of 15%, as in Example 2.

The treated granules containing roughly 15% by weight of moisture were milled into a very fine powder such that more than 65% by weight of the material passed through 325 mesh screen (65% by weight −325 mesh), preferably 75 to 85% −325 mesh.

The powder was pressed into cylindrical pellets of ½" diameter and ¼" long using a pressure of 40,000 to 80,000 psi, and the apparent density of the pellets was in the range 1.1 to 1.2 grams/cc. The pellets were re-granulated to obtain 6×20 mesh granules which had an apparent density of 0.62 to 0.66 gram/cc.

The reformed granules were loaded into a cylindrical furnace and devolatilized as described in Example 2, but with no charring being necessary prior to such devolatilization. The devolatilized granules, which had an apparent density of 0.56 to 0.60 gram/cc, were activated in the manner also set forth in Example 2.

The overall yield of granular activated carbon, based on the dry coal was in the range of 25 to 30% by weight, versus 15 to 20% for Example 1 and 20 to 25% for Example 2. The granules had a surface area of 1000 $m^2$/gram, versus 600 to 900 for Example 1, an iodine number of 950 to 1000, an ash content of 4 to 7% by weight, as compared to 6 to 8% for Example 1, an abrasion number of 70, as compared to 55 to 60 for Example 1, and an apparent density of 0.46 to 0.48 gram/cc as compared to 0.40 to 0.44 for Example 1. The yield was higher than in Example 2 ($H_2SO_4$).

Thus, the resulting granules were hard, very adsorptive, low in ash, and in most respects comparable to the grades of granular activated carbon preferred for use in water and waste water treatment and in other applications. It is to be noted once again that an acceptable product can be made from brown coal without a carbonaceous binder and without charring, and that treatment with dilute aqueous acid solution significantly increases yield and adsorption, while also reducing ash content, as compared to Example 1. As for using $H_2SO$ or $H_3PO_4$ as the acid in the aqueous solution, $H_3PO_4$ is believed to be more effective in producing a granular activated carbon product with higher yield. As becomes evident, the exact amount of improvement in yield depends upon the specific treatment conditions and other process conditions employed.

EXAMPLE 4

Diluted $H_2SO_4$ Treated Brown Coal Granules (With Pitch) in Making Granular Activated Carbon The procedure of Example 2 was followed up to the drying step, but instead of drying partially to about 15% moisture, the granules were dried thoroughly (i.e., to a moisture content of not more than about 1 or 2% by weight), and then, as shown on the right side of the drawing, the treatment was completed by mixing the granules uniformly with a No. 125 coal tar pitch having the following properties:

| | |
|---|---|
| Softening Point | 129.2° C. |
| Benzene Insolubles | 33.2% by weight |
| Quinoline Insolubles | 13.1% by weight |
| Coking Value (Conradson) | 61.1% by weight |
| Ash | 0.17% by weight. |

The thoroughly dried granules and pitch were mixed in the proportion of 90 grams coal and 10 grams pitch (i.e., 10 parts pitch per hundred parts coal pitch mixture, by weight), and this mixture milled into more than (65% by weight −325 mesh powder, preferably 75 to 85% −325 mesh, which powder was pressed into pellets of ½" diameter and ¼" high using a pressure in the range of 40,000 to 80,000 psi. The bulk density of the pellets was in the range 1.1 to 1.2 grams/cc, and they were granulated to obtain granules of 6/20 mesh and having an apparent density of 0.66 gram/cc.

600 grams of the granules were loaded into a cylindrical container and were devolatilized according to the procedure described in Example 2, without the charring step. The devolatilized granules had an apparent density of 0.64 gram/cc and a yield of 50 to 55% by weight based on the dry coal pitch mixture.

The devolatilized granules were loaded into a cylindrical furnace and subjected to activation as also set forth in Example 2.

The overall yield of granular activated carbon in this more preferred embodiment of the inventive process, based on the dry coal pitch mixture was in the range of 24 to 28% by weight compared to 15 to 20% for Example 1 and 20 to 25% for Example 2. The granules had a surface area of 1050 $m^2$/gram, as compared to 600 to 900 for Example 1, and 1000 for Example 2 and an iodine number of 1000 to 1050, as compared to 950 to 1000 for Examples 2 and 3, an ash content of 4 to 6% by weight, as compared to 6 to 8% for Example 1, an abrasion number of 70 to 80, as compared to 55 to 60 for Example 1, and 70 for Examples 2 and 3, and an apparent density of 0.48 to 0.50 gram/cc, as compared to 0.40 to 0.44 for Example 1, 0.46 to 0.48 for Examples 2 and 3.

Thus, the resulting granules were hard, very adsorptive, low in ash, and in all respects comparable to the grades of granular activated carbon preferred for use in water and waste water treatment and in other applications. It is particularly noteworthy that, compared to the no acid and the charring approach of Example 1, the overall yield was considerably improved when the coal was subjected to treatment with a dilute aqueous acid solution, followed by mixing with pitch, with no charring, while at the same time yielding a product that was superior in adsorption properties, density and abrasion resistance. As for the $H_2SO_4$ acid no pitch procedure of Example 2, there was a slight increase in low molecular adsorption (Iodine number) and a significant increase in adsorption capacity (surface area), abrasion resistance and apparent density. With respect to the $H_3PO_4$ acid no pitch procedure of Example 3, there was a slight increase in adsorption (surface area and Iodine number) and apparent density, and a significant increase in abrasion resistance.

EXAMPLE 5

Dilute $H_3PO_4$ Treated Brown Coal (With Pitch) Making Granular Activated Carbon The same procedure, as set forth in Example 4 was followed, except that 75% concentrated $H_3PO_4$ was substituted for the $H_2SO_4$ (making the acid about 6.5% by weight of the granules). The apparent density of the reformed compacted granules was 0.64 gram/cc instead of 0.66, while the devolatilized granules had an apparent density of 0.62 to 0.62 gram/cc instead of 0.64, and a yield of 60 to 65 by weight, based on the dry coal pitch mixture instead of 50 to 55%.

The overall yield of granular activated carbon in this most preferred embodiment of the inventive process, based on the dry coal pitch mixture was in the range of 26 to 32% by weight, as compared to 15 to 20% for Example 1, 20 to 25% for Example 2, 25 to 30% for Example 3, and 24 to 28% for Example 4. The granules had a surface area of 1050 $m^2$/gram, as compared to 600 to 900 for Example 1, and 1000 for Examples 2 and 3, an iodine number of 1000 to 1050, as compared to 950 to 1000 for Examples 2 and 3, a Molasses number of about 225, an ash content of 4 to 6% by weight, as compared to 6 to 8% for Example 1, an abrasion number of 70 to 80, as compared to 55 to 60 for Example 1, and 70 for Examples 2 and 3, and an apparent density of 0.48 to 0.50 gram/cc, as compared to 0.40 to 0.44 for Example 1, 0.46 to 0.48 for Examples 2 and 3.

Thus, the resulting granules were hard, very adsorptive, low in ash and in all respects comparable to the grades of carbon preferred for use in water and waste water treatment and in other applications. It is particularly noteworthy that the overall yield was considerably improved, not only over Example 1, but also over each of Examples 2, 3 and 4, with a substantial increase in adsorption, purity, abrasion resistance, and density over Example 1. Likewise, there was a significant increase in abrasion resistance over Examples 2 and 3, and a significant increase in density and adsorption over Example 2.

This improved yield of hard, dense, adsorptive granular activated carbon, obtained by treating brown coal with a dilute aqueous solution of $H_3PO_4$ is indeed an unexpected result over the art. Further, such improved yield is believed to be comparable to that obtainable from the higher valued bituminous coal, the traditionally preferred raw material. More importantly, such unexpected result is achieved by eliminating the charring step believed to be necessary in the use of bituminous coal.

The next two Examples represent an endeavor to see what happens when bituminous coal is treated in accordance with the inventive process, first without dilute acid treatment (Example 6) and second with dilute acid treatment (Example 7).

EXAMPLE 6

Use of Bituminous Coal and Pitch to Make Granular Activated Carbon

The starting material was a batch of eastern bituminous coal having the following analyses by weight:

| Proximate Analysis | | | Ultimate Analysis | | |
|---|---|---|---|---|---|
| | As Received | Dry | | As Received | Dry |
| % Moisture | 2.04 | — | % Moisture | 2.04 | — |
| % Ash | 1.20 | 1.26 | % Carbon | 82.30 | 84.00 |
| % Volatile Material | 33.10 | 33.80 | % H | 5.20 | 5.29 |
| | | | % $N_2$ | 1.30 | 1.33 |
| % Fixed Carbon | 63.60 | 64.90 | % S | 0.34 | 0.35 |
| BTU/lb. | 14,571 | 14,874 | % Ash | 1.23 | 1.26 |

These analyses are, in general, typical of eastern bituminous coals. These coals also are highly coking and low in ash content. The dried coal was crushed to obtain 8×30 mesh granules which were mixed with No. 125 coal tar pitch of the type described in Examples 4 and 5, and in the ratio of 90 grams of coal granules and 10 grams of pitch (10 parts per hundred by weight).

The mixture was milled into a very fine powder so that 65% of the powder passed through 325 mesh screen. The milled powder was compressed into pellets ½" diameter and ½" high using a pressure of 40,000 to 80,000 psi. The pellets had a bulk density of 1.18 grams/cc and were granulated to obtain 6×20 mesh granules having an apparent density of 0.65 gram/cc.

600 grams of the granules were loaded into a cylindrical furnace and were subjected to the charring process substantially as described in Example 1. However, in this case, the charring consisted of heating the granules from room temperature to 250° C. at 100° C./hour and maintaining at temperature for 2 hours. An atmosphere of 0.5 standard cubic feet per hour at one atmosphere and room temperature (SCFH) of $N_2$ and 0.5 SCFH of air was fed into the furnace while the cylindrical container was rotating at 1 to 4 rpm.

In the course of experimentation it was found that heating rate, atmosphere (particularly the amount of oxygen present), temperature and time at temperature were critical variables that had an important influence on how the granules were suited for further processing in making hard granular activated carbon. For example, too small a time (less than ½ hour) at temperature or too low a temperature (lower than 200° C.), in general, led to difficulties in further processing of the granules. Thus, without proper charring, during the devolatilization step, the granules fused together and were unsuitable for proper activation and for obtaining the desired properties of granular activated carbon.

When properly charred, as described above, the yield of the granules was 69% by weight, based on the dry coal pitch mixture and they had an apparent density of 0.62 gram/cc.

The charred granules then were devolatilized and activated in the same manner as described in Example 1.

At the end of the process, hard granular activated carbon was obtained, with an overall yield of 34.0% by weight based on the dry coal pitch mixture. The granules had an apparent density of 0.50 gram/cc, an Iodine number of 1080, a surface area of 1040, an ash content of 2.2% by weight, and an abrasion number of 80.

Thus, the resulting granules were hard, very adsorptive, low in ash, and in all respects very much comparable to the grades of carbon preferred for use in water and waste water treatment and in other applications. However, it is particularly noteworthy that hard granular activated carbon could not be made from this bituminous coal without subjecting the granules to the charring step described above, prior to devolatilization and activation. During the course of experimentation, granules were devolatilized without the charring step and a fused mass (instead of granules) unsuitable for activation was obtained, thus indicating the necessity and importance of the charring step.

EXAMPLE 7

Dilute $H_3PO_4$ Treated Bituminous Coal and Pitch to Make Granular Activated Carbon The same procedure, as set forth in Example 6, was followed through the initial granulating step. At this point, 300 grams of the coal granules were loaded into a 4 liter kettle. A dilute aqueous acid solution consisting of 150 grams of 75% concentrated $H_3PO_4$ and 2850 grams of water was added to the granules (about 6.5% by weight). The mixture was heated to 80° C. and maintained at this temperature for 5 hours, while the granules were continuously stirred. The contents were allowed to cool, acid solution decanted and the coal was thoroughly washed such that the wash water off the granules analyzed to a pH of 6 to 7.

The leached coal was dried thoroughly, and then was mixed uniformly with the coal tar pitch of Example 4 in the same proportions of 90 grams coal and 10 grams pitch. The mixture was milled into 65% by weight −325 mesh powder, and was pressed into pellets of ½" diameter and ¼" high using a pressure in the range of 40,000 to 80,000 psi. The bulk density of the pellets was in the range 1.1 to 1.2 grams/cc, and they were re-granulated to obtain 6×20 mesh granules having an apparent density at this stage of 0.64 gram/cc.

The reformed granules were loaded into a cylindrical furnace and were subjected to the charring step described in Example 6, producing a 71% by weight yield and an apparent density of 0.63 gram/cc. In the course of experimentation, it was learned that, even for acid treated bituminous coal, the charring step was necessary as a pre-treating step, in order to obtain proper granular activated carbon.

The charred granules then were devolatilized and activated in the manner described in Example 1.

At the end of the activation step, hard granular activated carbon was obtained, with an overall yield of 35% by weight based on the dry coal pitch mixture. The granules had an apparent density of 0.50 gram/cc, a surface area of 1000 $m^2$/gram, an iodine number of 1050, an ash content of 2.4% by weight, and an abrasion number of 82.

Thus, the granules were hard, very adsorptive, low in ash and in all respects very much comparable to the grades of carbon preferred for use in water and waste water treatment and in other applications. At the same time, it is particularly noteworthy that hard granular activated carbon could not be made from this bituminous coal without subjecting the granules to the charring step described above, even though the coal had been dilute acid treated. In this regard, the result is very much unlike that for brown coal, wherein acid treatment enables one to eliminate the charring step, while still producing an acceptable product.

Another important and notable feature was that the acid treatment of bituminous coal with dilute $H_3PO_4$ did not appear to significantly alter the yield (from 34 to 35%). In contrast, this result was very much unlike that for the brown coal of Examples 2–5 wherein dilute inorganic acid treatment of the coal led to substantially improved yield from the 15 to 20% for Example 1, particularly to the 26 to 32% of Example 5 ($H_3PO_4$) which approaches the 34 to 35% yields of these last two Examples. These two results were indeed unique and unexpected in dealing with brown coal.

The next Example represents an attempt to apply the dilute acid treating technique of the invention to lignite, which ranks lower than sub-bituminous coal, but is ranked together with and usually slightly above brown coal.

EXAMPLE 8

Dilute $H_3PO_4$ Treated Lignite Coal (With Pitch) in Making Granular Activated Carbon The starting material in this Example was a batch of lignite coal having the following analyses by weight:

| | Proximate Analysis | | Ultimate Analysis | | |
|---|---|---|---|---|---|
| | As Received | Dry | | As Received | Dry |
| % Moisture | 30.3 | — | % Moisture | 30.30 | — |
| % Ash | 9.9 | 14.2 | % Carbon | 41.50 | 59.5 |
| % Volatile Material | 50.0 | 71.7 | % H | 3.15 | 4.5 |
| | | | % $N_2$ | 3.50 | 5.0 |
| % Fixed Carbon | 9.8 | 14.0 | % S | 0.73 | 1.4 |
| | | | % Ash | 9.90 | 14.2 |

These analyses are, in general, typical of lignite type coals, and these coals, in general, have a high ash content compared to other coals. The as received coal was crushed to 8×30 mesh granules and 300 grams of these granules were loaded into a 4 liter kettle and 150 cc of concentrated $H_3PO_4$ (75%) and 2850 cc of water were added (6.5% by weight of acid). The granules and the acid solution were heated to 80° C. and maintained at this temperature for 5 hours, while the granules were continuously stirred. The contents were allowed to cool, the solution decanted, and the granules were thoroughly rinsed such that the wash water off the granules analyzed to a pH of 6 to 7. The granules were dried thoroughly and mixed into 10 parts per hundred of coal tar pitch of the type described in Examples 3 and 4.

This mixture was thoroughly milled such that more than 65% of the powder material passed through 325 mesh screen, preferably 75 to 85% −325 mesh. The powder was pressed into cylindrical pellets of ½" diameter and ¼" high, using a pressure of 40,000 to 80,000 psi, the apparent density of the pellets being in the range of 1.1 to 1.2 grams/cc. The pellets were granulated to obtain 6×20 mesh granules having an apparent density of 0.64 to 0.66 gram/cc. The granules were loaded into a cylindrical furnace and were devolatilized as described in Example 1. Two batches of granules with identical processing were devolatilized, one with a charring step, as described in Example 1 and the other without a charring step, as described in Examples 2–5. The two batches were similar in regard to the overall yields and activity, indicating that the charring step is not a necessary requisite for this type of coal.

The devolatilized granules were activated as in Examples 1–5. The granules had very low apparent density, of 0.30 gram/cc, a surface area of 850, an Iodine number of 700 to 900, an ash content of 11.5% by weight, and an abrasion number of 30. Repeated experiments to optimize the properties, while showing some improvement, did not produce the preferred required density of 0.48 gram/cc or higher, and abrasion number of 70 or higher. Thus, an acceptable granular activated carbon which is hard and suitable for use in water and waste water treatment and in other applications could not be produced under the aforementioned conditions from lignite coal.

Thus, it is patently obvious from this and the foregoing Examples that:

A. Treating a bituminous coal in dilute aqueous acid solution did not materially affect the processability of the coal into hard granular carbon or the present yield of the said carbon from coal, and the dilute acid treating step did not eliminate the necessity of a charring step.

B. Treating a lignite coal in dilute aqueous acid solution did not result in an acceptable granular activated carbon where the carbon from lignite was too light and too soft.

C. In contrast, and surprisingly so, it clearly has been demonstrated in the preferred inventive embodiments that hard granular activated carbon suitable for use in water and waste water treatment and in other applications can be produced from brown coal for the first time, provided the said coal is subjected to treatment in dilute aqueous acid solution (because very hard granular activated carbon can not be produced from the untreated brown coal), and that such treatment does result in an unexpected and hence an inventive result of high percent yield of granular activated carbon from brown coal, where the yield is fairly comparable to that from bituminous coal, particularly comparing Example 5 to Examples 6 and 7.

D. Another indeed unexpected result of the treatment of brown coal in dilute aqueous acid solution is that the charring step found necessary for treated and untreated bituminous coal and for untreated sub-bituminous or brown coal can be eliminated in making hard, dense, adsorptive granular activated carbons from so treated brown coal.

E. An additional, and most surprising unexpected result of the inventive acid treatment of brown coal is the fact that it works in a manner comparable to that for sub-bituminous coal, as described in my aforesaid co-pending application Serial No. 884,084, but not for the lignite coal of this Example. Logically, one skilled in the art would expect a downward, step by step applicability of such acid treatment from sub-bituminous coal; but this has not proven to be the case from experimentation to date. Thus, the nature of the starting coal is an important, and apparently critical factor in determining the applicability or non-applicability of a particular mode of treatment such as that of the present invention, and the results of such treatment are not predictable on a logical basis.

The next Example is similar to Example 5, but emphasizes the importance of fineness of grind in powderizing the treated granules before compressing.

EXAMPLE 9

Fineness of Powder in Using Dilute $H_3PO_4$ Treated Brown Coal (With Pitch) in Making Granular Activated Carbon The same procedure, as set forth in Example 5, and as illustrated at the lower right in the drawing, was followed. The treated granules were washed with wash water, analyzed to a pH of 6 to 7 and dried thoroughly before mixing with 10 parts per hundred by weight of No. 125 coal tar pitch. Then the mixture was divided into two equal parts.

The first part was milled to a fine powder which was about 60 to 65% $-325$ mesh. The powder was compacted into pellets of approximately $\frac{1}{4}''$ high and $\frac{1}{4}''$ diameter under a pressure of 40,000 to 80,000 psi, and the apparent density of the pellets was in the range of 1.1 to 1.2 grams/cc. The pellets were granulated, to 6×20 mesh and the density of the granules was 1.0 to 1.1 grams/cc. The granules were devolatilized as in Example 5 and the density of the granules was 0.62 to 0.64 gram/cc. These granules were activated as described in earlier Examples 1 and 5, and these activated granules had a density of 0.46 to 0.50 gram/cc, an Iodine number of 1000 to 1050, a surface area of 1050 $m^2$/gram, ash content of 5 to 6% and an abrasion number of 60 to 70. Thus, these granules are considerably softer and hence are not too suitable for use in water and waste water treatment and in other applications, because of possible excessive loss of material in use and regeneration, when the granules are not very hard.

The second part was milled to a very fine powder such that it had a particle size of more than 65% by weight $-325$ mesh, i.e., 75 to 85% by weight $-325$ mesh. The powder was compacted, as above, to a pellet density of 1.1 to 1.2 grams/cc; the pellets were granulated and had a density of 0.64 to 0.66 gram/cc. The granules were devolatilized as in Example 5 and the density of granules was 0.64 to 0.66 gram/cc. The granules were activated, as above, and the apparent density of the activated granules was 0.48 to 0.50 gram/cc. The granules had an Iodine number of 1000 to 1050, surface area of 1050 $m^2$/gram, ash content of 5 to 6% and an abrasion number of 70 to 80.

Since the granules were subjected otherwise to identical processing conditions in part 1 and part 2, it is believed that the finer grinding of the treated brown coal granules (75 to 85% $-325$ mesh) resulted in compact granules and hence a hard granular product. In contrast, as described in Examples 6 and 7, grinding the bituminous coal to 65% $-325$ mesh resulted in a hard granular product.

Thus, the fineness of the grind prior to compaction, forms a preferred embodiment of the present invention.

The next Example represents the workability of HCl as the dilute aqueous acid in the inventive technique.

EXAMPLE 10

Dilute HCl Treated Brown Coal (Without and With Pitch) in Making Granular Activated Carbon A batch of Australian brown coal briquettes, as described in Example 1, was crushed and screened to obtain 8×30 granules. 300 grams of the granules were loaded into a 4 liter kettle and a dilute aqueous acid solution consisting of 300 cc of 37.5% concentrated HCl and 2700 cc of water was added to the granules (about 5% by volume and 6.5% by weight). The granules and the acid solution were heated to 80° C. and maintained at this temperature for 5 hours, while the granules were continuously stirred.

The contents of the kettle were allowed to cool, the solution decanted and the granules thoroughly rinsed such that the waste water off the granules analyzed to a pH of 6 to 7. The granules were dried either: (A) to 15% moisture, where further processed without a carbonaceous binder, as in Examples 2 and 3, to a granular activated carbon product, or (B) thoroughly, where 10 parts per hundred of pitch were added and processed as in Examples 4 and 5.

The partially dried coal granules and the thoroughly dried coal pitch mixture were milled to a very fine size, such that more than 65% of the material passed through 325 mesh, preferably 75 to 85% of material passed through 325 mesh. The powder was pressed into cylindrical pellets of $\frac{1}{4}''$ diameter and $\frac{1}{4}''$ high using a pressure of 40,000 to 80,000 psi; the apparent density of the pellets being in the range 1.1 to 1.2 grams/cc. These pellets were regranulated to 6×20 mesh having an apparent density of 0.60 to 0.65 gram/cc, and these granules were devolatilized, without charring, and activated, as in Examples 2-5.

(A) The resulting overall yield of granular activated carbon, based on dry coal (pitchless), was 22 to 26% by weight. The granules had a surface area of 900 to 1000 $m^2$/gram, an Iodine number of 900 to 950, an ash content of 4 to 6% by weight, an abrasion number of 70 and an apparent density of 0.46 to 0.50 gram/cc. Compared to Example 1, the yield, adsorption and abrasion resistance were significantly increased. Compared to Examples 2 and 3, the yield was comparable to Example 2 ($H_2SO_4$), but somewhat less than for Example 3 ($H_3PO_4$), while the other properties generally were comparable.

(B) The resulting overall yield of granular activated carbon, based on the dry coal pitch mixture, was 24 to 27% by weight, and the granules had a surface area of 900 to 1000 $m^2$/gram, an Iodine number of 900 to 950, an ash content of 4 to 6% by weight, an abrasion number of 70 to 80, and an apparent density of 0.48 to 0.50 gram/cc. Compared to Example 1, the yield, surface area, abrasion number and apparent density were significantly increased, and the ash content significantly decreased. As compared to Examples 2 and 3 and (A) above (pitchless), the abrasion resistance was significantly increased, and the yield and apparent density were slightly increased over Example 2 and (A) above. As compared to Examples 4 and 5, the yield was slightly less than for Example 4 ($H_2SO_4$ with pitch), and significantly less than for Example 5 ($H_3PO_4$ with pitch).

However, in each of (A) and (B) above, as compared to Example 1, treating the brown coal with a dilute aqueous solution of HCl resulted in higher yield and improved adsorption, greater abrasion resistance and higher purity, making such inventive product suitable for use in water and waste water treatment and in other applications, while at the same time eliminating the need for the charring step.

The next and last Example demonstrates the beneficial effect of dilute acid treatment in converting volatile carbon containing material in brown coal to a non-volatile or cross-linked state.

EXAMPLE 11

Beneficial Effect of Dilute Acid Treatment on Brown Coal in Making Granular Activated Carbon Proximate analyses were obtained of the brown coal granules, prior to and following acid treatment thereof substantially in accordance with Example 5, in order to compare with the proximate analysis of the below described batch of Australian brown coal granules similar to the starting coal granules used in such Example, the only significant departure from the Example procedure being that the ratio of solution to coal was about 4/1 instead of about 10/1, with the heating being between 80° and 90° C. for about 1 hour instead of at 80° C. for 5 hours. In each instance, the following proximate analyses were obtained prior to and subsequent to the dilute acid treatment respectively, the latter analyses being made following the washing off the acid and drying steps, with the drying being carried out to the moisture content indicated in the TABLE below in the "AS RECEIVED" columns, and the "DRY" figures being calculated from the "AS RECEIVED" figures to provide uniform moisture-free basis for comparison.

TABLE

OF PROXIMATE ANALYSES BY WEIGHT %

| AS RECEIVED | STARTING COAL | $H_3PO_4$ ACID TREATMENT |
|---|---|---|
| Moisture | 10.68 | 5.65 |
| Volatile Material | 45.42 | 43.15 |
| Ash | 0.94 | 2.16 |
| Fixed Carbon | 42.96 | 49.09 |

TABLE-continued

OF PROXIMATE ANALYSES BY WEIGHT %

| AS RECEIVED | STARTING COAL | $H_3PO_4$ ACID TREATMENT |
|---|---|---|
| DRY | | |
| Volatile Material | 50.85 | 45.73 |
| Ash | 1.05 | 2.29 |
| Fixed Carbon | 48.09 | 51.97 |

The above TABLE shows that even on an "AS RECEIVED" basis, the acid treatment produced a substantial increase in fixed carbon content, and that on a moisture-free or "DRY" basis, which is the only uniform basis for comparison, such acid treatment produced not only a substantial increase in fixed carbon content but also a substantial decrease in volatile matter content, thereby indicating a substantial conversion of the volatile carbon containing components to a non-volatile fixed carbon state. The above TABLE also shows that on such "DRY" basis, no substantial reduction in ash content occurred because of the dilute acid treatment, and that such treatment actually resulted in a slight increase in ash content, which could be a result of the variability of the materials and test methods.

In summary, such acid treatment is essential in order to enhance the "age" of the brown coal by a chemical reaction which converts the resinous and other carbon containing components (viz. coal tars) from a volatile to a non-volatile state, also referred to as cross-linking. Thus, by reason of such conversion, during devolatilization there is formed a cross-linked carbon residue well suited to produce activated carbon, resulting in a doubly unexpected advantage of higher yield and activity. This is evident from the previously noted comparisons of the results obtained by inventive Examples 2-5 and 10 with those of Example 1 (no acid treatment). Furthermore, it is apparent from the above TABLE that the inventive dilute acid treating does not result in ash content reduction.

It now is seen how the invention accomplishes its various objectives. Likewise, it is to be understood that while the invention has been described and illustrated herein by reference to certain preferred embodiments, the same are to be considered as illustrative, rather than as limiting.

What is claimed is:

1. A process for making hard granular activated carbon having an abrasion number of not less than about 70, an ash content of not more than about 8% by weight and being suitable for use in water and waste water treatment and in other applications comprising:
    forming granules from brown coal from which iron material is magnetically extracted;
    treating the granules with a dilute aqueous solution of inorganic acid to reduce the volatile content and thereby increase the fixed carbon content comprising: mixing the granules with the acid for a time and at a temperature, acid concentration and solution to coal ratio sufficient to eliminate subsequent charring, washing off the acid, and drying the granules at least partially to a moisture content below about 25% by weight;
    reducing the treated granules to form fine powder;
    compressing the powder to form shapes;
    reducing the shapes to reform granules;
    devolatilizing the reformed granules, without charring, by directly heating to and at a temperature higher than the charring temperature in an oxygen-free atmosphere; and activating the devolatilized granules by heating to and at a temperature higher than the devolatilizing temperature in an atmosphere containing a gaseous activating agent.

2. Hard granular activated carbon made by the process of claim 1.

3. The process of claim 1 wherein the extracted coal has an ash content of not more than about 5% by weight, dry basis.

4. The process of claim 1 wherein the extracted coal has an ash content below 5% by weight, dry basis.

5. The process of claim 1 wherein, prior to forming the granules from the coal, the coal is pre-treated by magnetically extracting iron material therefrom.

6. The process of claim 1 wherein, prior to forming the granules from the coal, the coal is pre-treated by reducing the coal to form coarse particles from which iron material is magnetically extracted, followed by further reducing the extracted coarse particles to form fine particles which are dried partially to a moisture content of about 10 to about 25% by weight, followed by compressing the partially dried fine particles under a pressure of not less than about 5000 psi to form briquettes, from which the granules are formed.

7. The process of claim 1 wherein at least one of the extracted coal and granules has a moisture content of not more than about 25% by weight prior to treating the granules.

8. The process of claim 1 wherein at least one of the extracted coal and granules has a moisture content of about 10 to about 25% by weight prior to treating the granules.

9. The process of claim 1 wherein the acid is selected from the group consisting of $H_2SO_4$, $H_3PO_4$, HCl and mixtures thereof, and the overall yield of granular activated carbon is not less than about 20% by weight, dry basis.

10. The process of claim 1 wherein the acid is $H_3PO_4$ and the overall yield is not less than about 25% by weight, dry basis.

11. The process of claim 1 wherein the acid concentration is between about 1 and about 10% by weight.

12. The process of claim 1 wherein the powder is more than about 65% −325 mesh.

13. The process of claim 1 wherein the powder is compressed to form shapes under a pressure of not less than about 40,000 psi.

14. The process of claim 1 wherein during devolatilization the heating rate is about 50° C. to about 300° C. per hour, the temperature is about 400° C. to about 600° C., and the time is about ½ hour to about 3 hours.

15. The process of claim 1 wherein during activation the heating rate is about 100° C. to about 1000° C. per hour, the temperature is about 600° C. to about 1000° C., and the time is about 1 hour to about 6 hours.

16. The process of claim 1 wherein the granules after being washed to remove the acid are dried thoroughly and thereafter mixed with about 5 to about 15% by weight of a carbonaceous binder.

17. Hard granular activated carbon made by the process of claim 16 and having an abrasion number of at least 70.

18. The process of claim 16 wherein the acid is $H_3PO_4$ and the overall yield of granular activated carbon is not less than about 26% by weight, dry coal binder basis.

19. The process of claim 16 wherein the powder is more than about 65% −325 mesh, and is compressed to form shapes under a pressure of not less than about 40,000 psi.

20. Hard granular activated carbon made by the process of claim 16 and having an ash content of not more than about 6% by weight.

21. The process of claim 1 wherein said granules after being washed to remove the acid are partially dried to a moisture content of about 10 to about 25% by weight, without the addition of a carbonaceous binder.

22. Hard granular activated carbon made by the process of claim 21 and having an ash content of not more than about 7% by weight.

23. The process of claim 21 wherein the acid is $H_3PO_4$, and the overall yield of granular activated carbon is not less than about 25% by weight, dry coal basis.

24. The process of claim 21 wherein the powder is more than about 65% −325 mesh, and is compressed to form shapes under a pressure of not less than about 40,000 psi.

* * * * *